July 28, 1931.  J. B. DRAPER  1,816,570
TESTING SYSTEM
Filed Aug. 13, 1930    8 Sheets-Sheet 3

INVENTOR
J. B. DRAPER
BY P. C. Smith
ATTORNEY

July 28, 1931.  J. B. DRAPER  1,816,570
TESTING SYSTEM
Filed Aug. 13, 1930    8 Sheets-Sheet 6

INVENTOR
J. B. DRAPER
BY P. C. Smith
ATTORNEY

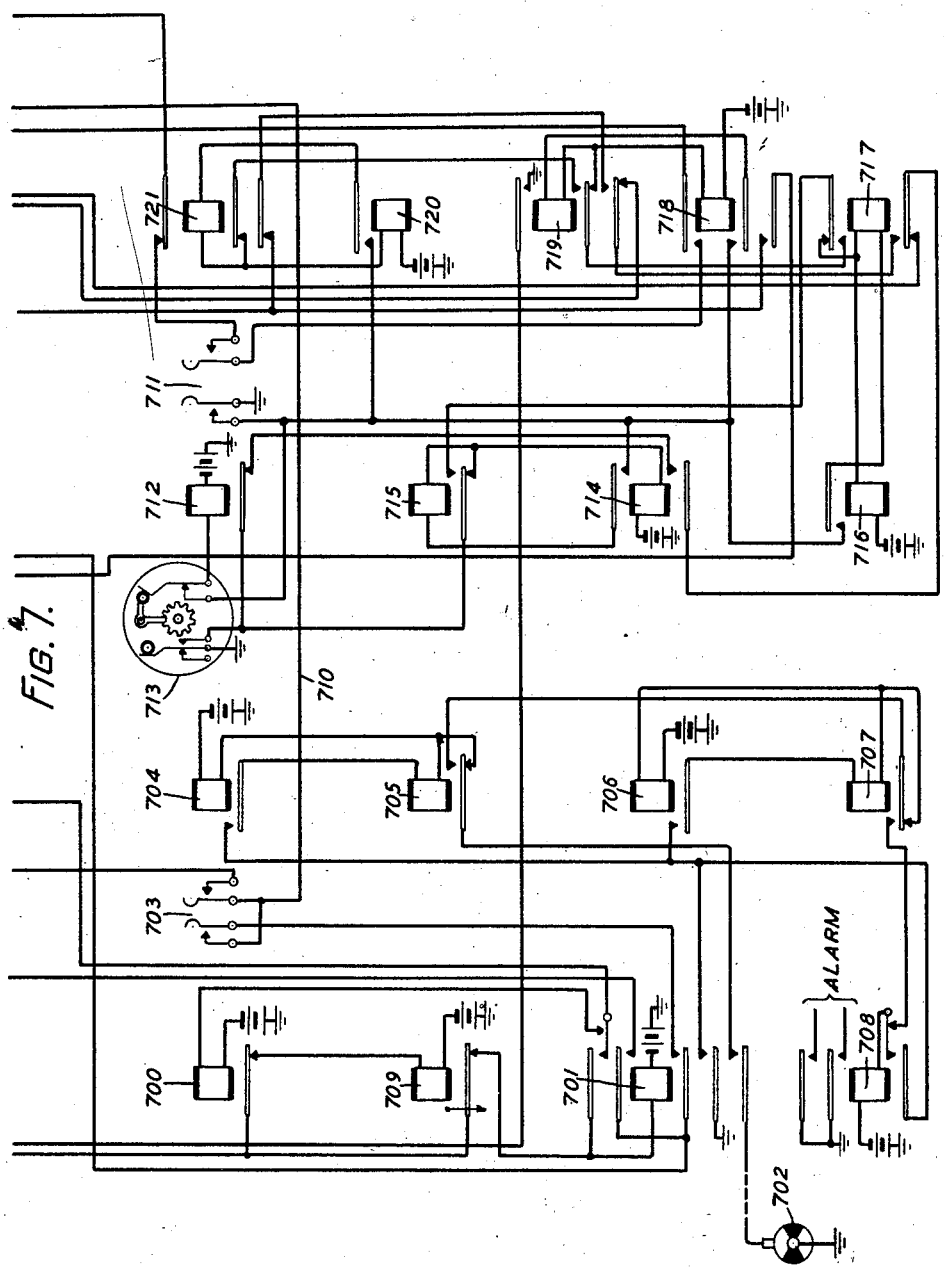

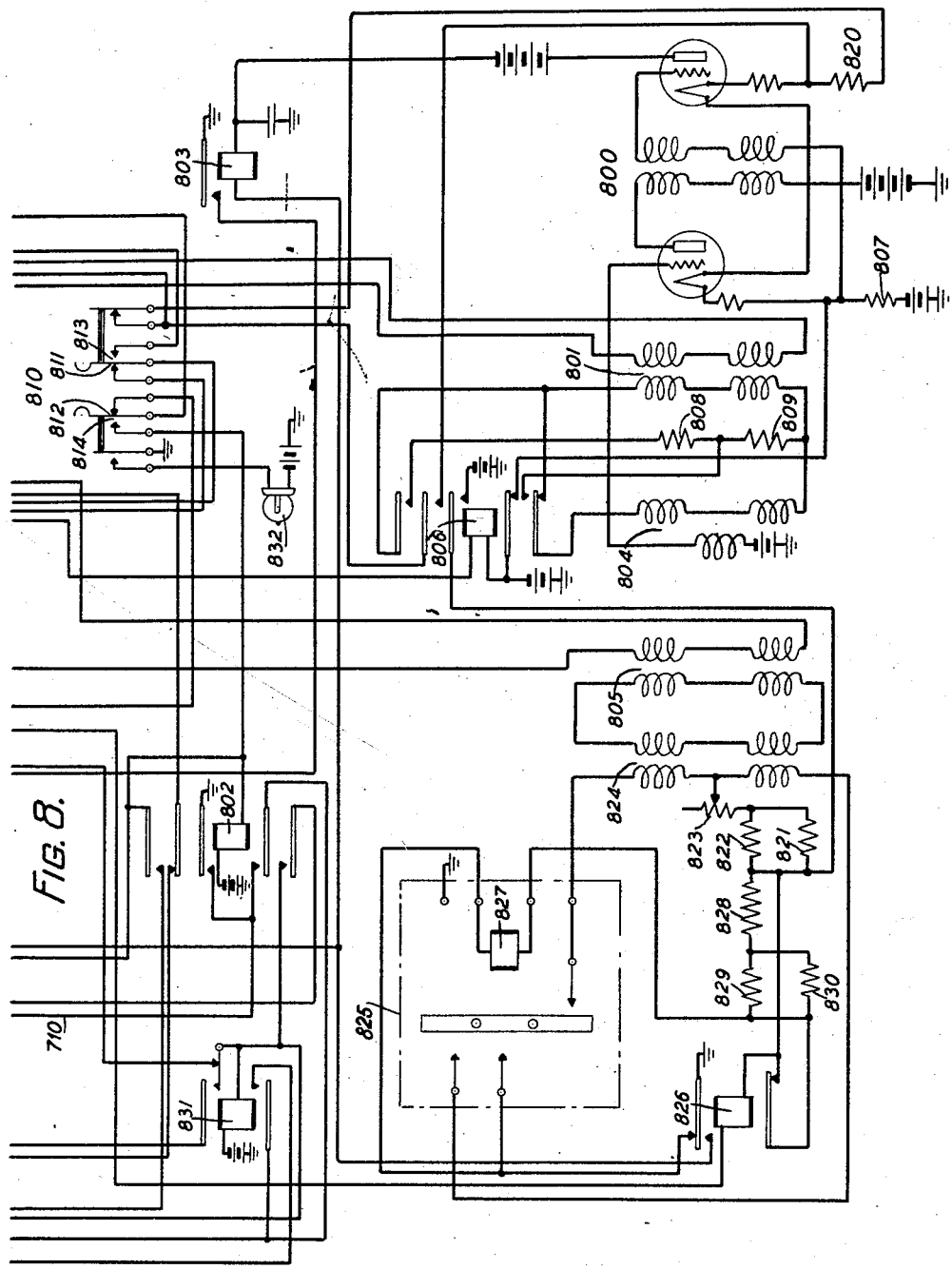

Patented July 28, 1931

1,816,570

UNITED STATES PATENT OFFICE

JOHN B. DRAPER, OF BROOKLYN, NEW YORK, ASSIGNOR TO BELL TELEPHONE LABORATORIES, INCORPORATED, OF NEW YORK, N. Y., A CORPORATION OF NEW YORK

TESTING SYSTEM

Application filed August 13, 1930. Serial No. 474,897.

The invention relates to an automatic telephone system and more particularly to a system for progressively selecting the apparatus of a telephone system for testing purposes.

The object of this invention is to provide an automatically operable testing device arranged for progressively associating a selector with telephone apparatus to be tested by transmitting impulses to the control apparatus of said selector and automatically altering the number of the impulses transmitted for varying the position to be taken by the selector.

One embodiment of the present invention comprises an arrangement of switches and electromagnetic devices for controlling the level in which a step-by-step selector shall test the connectors. Two rotary switches are used for variably transmitting impulses to the selector. One switch is rotated to a particular position for controlling the extent of movement of a second switch and thus control the number of impulses transmitted by the second switch during its rotary movement. By the transmission of impulses this test selector is positioned upon the various contact levels to be associated with the connectors. After the test of connectors associated with the contacts of a level the selector is restored to normal which operates electromagnetic switching apparatus in the testing device. This switching apparatus changes the position of the rotary switch for controlling the number of impulses transmitted by a second switch in order to position the selector brushes upon the contacts of a different level than the one in which the connectors have been tested.

The selector is positioned upon the first level of terminals by the foregoing testing device switching arrangement and thereafter is rotated to the connectors associated with each terminal in the level. When the eleventh terminal is reached the apparatus of the testing device is operated for restoring the selector to its normal position. This is accomplished by the energization of the release magnet through the apparatus of the testing circuit. The restoration of the selector repositions the auxiliary switch for controlling the movement of the impulsing switch. The second rotation of the impulsing switch under ordinary testing conditions advances the selector to the second level. After each complete test of the connectors associated with the terminals of a level the selector is restored to normal for controlling the advance of the auxiliary and impulse switch. A progressive routine test of the connectors associated with a complete switch is thus made. When all of the connectors associated with the levels of the switch have been tested the testing device is arranged for transferring the testing apparatus from one selector to another in order to test all of the connectors in the telephone office.

The invention will be more clearly understood from a consideration of the following description in connection with the drawings in which Fig. 1 shows a selector switch modified for use as a test selector;

Figs. 3 to 8 show the details of the test circuit itself.

Figure 1:
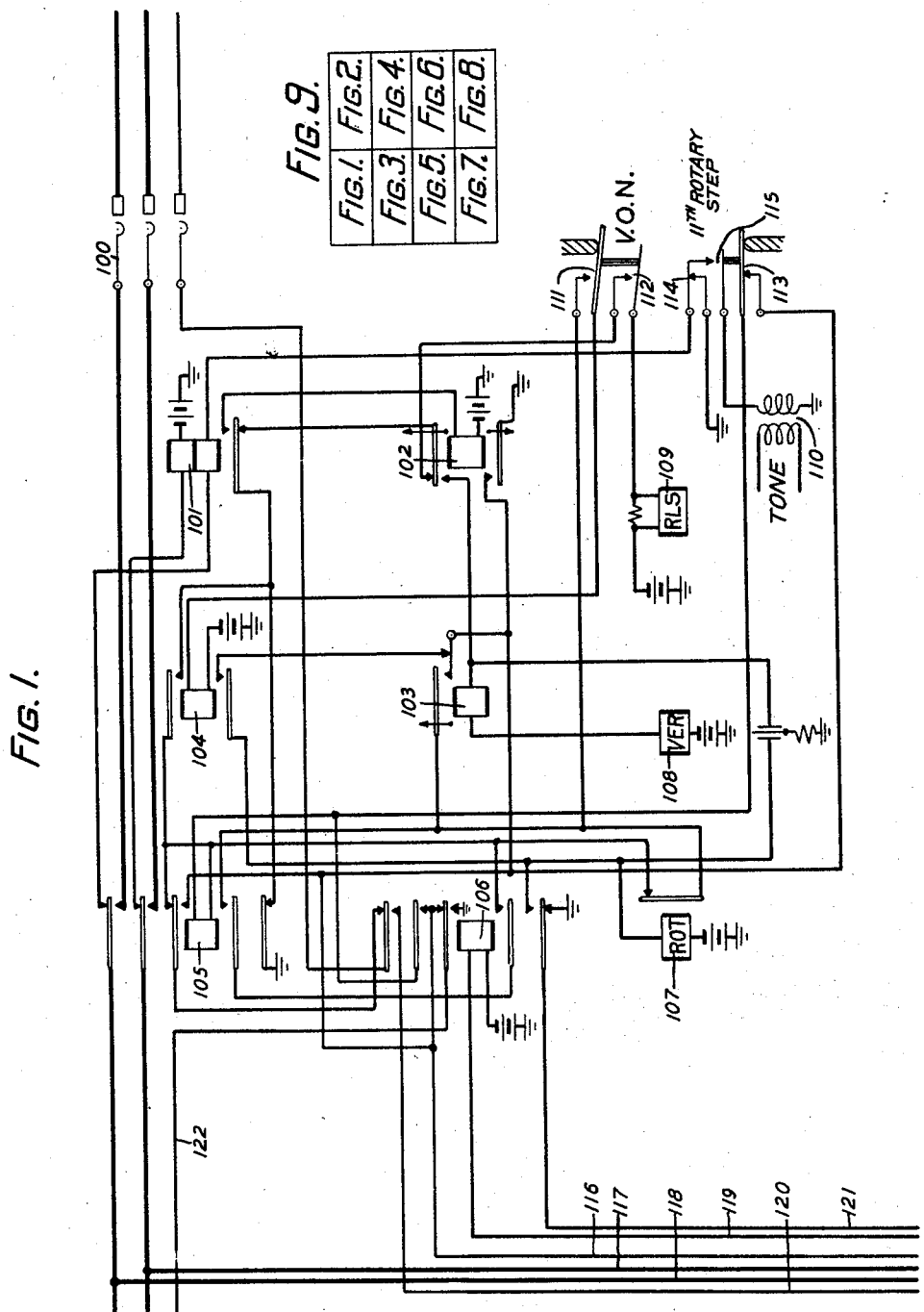
Figure 2:
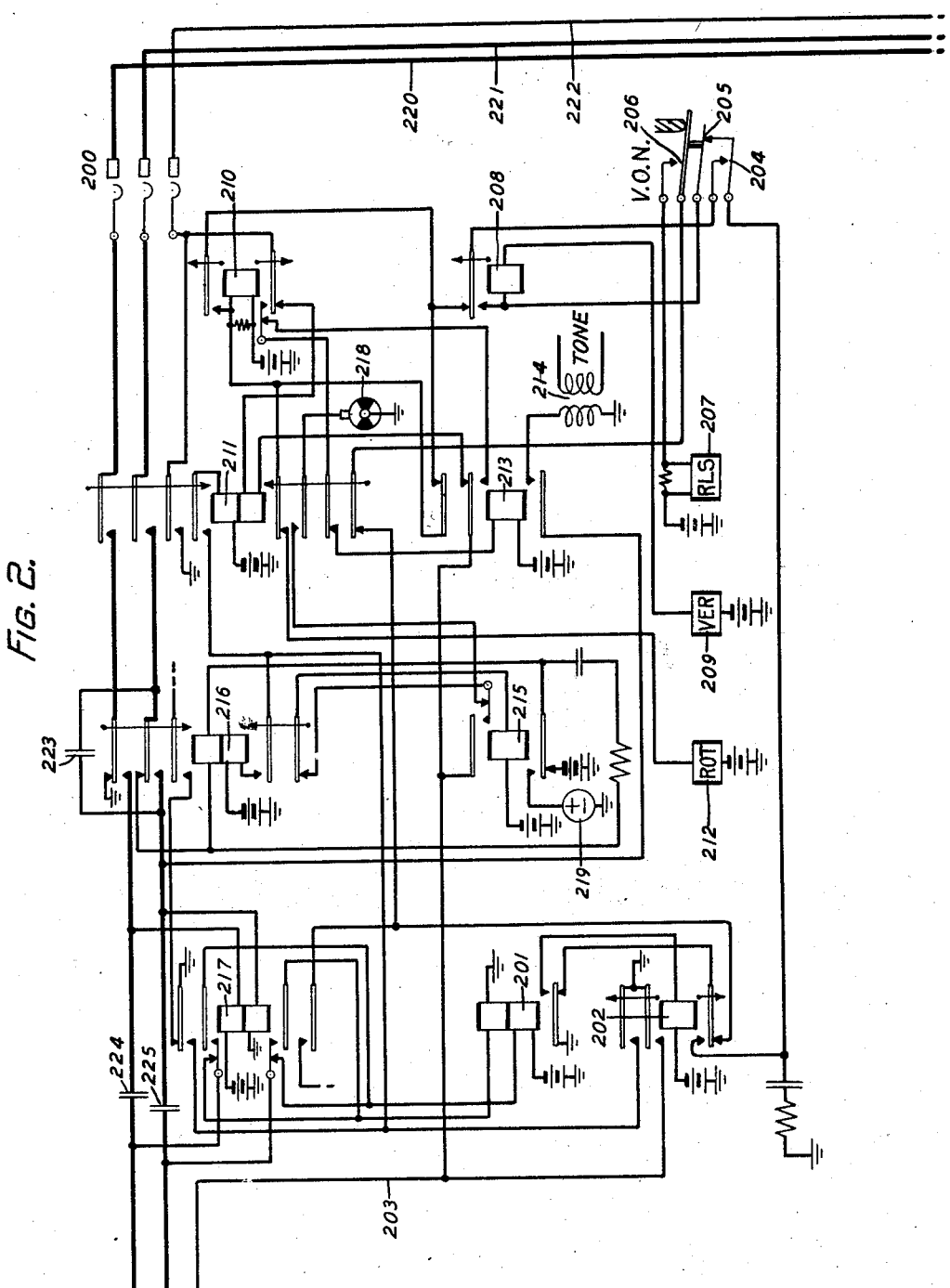
Fig. 2 shows a connector to be tested.
Figure 3:
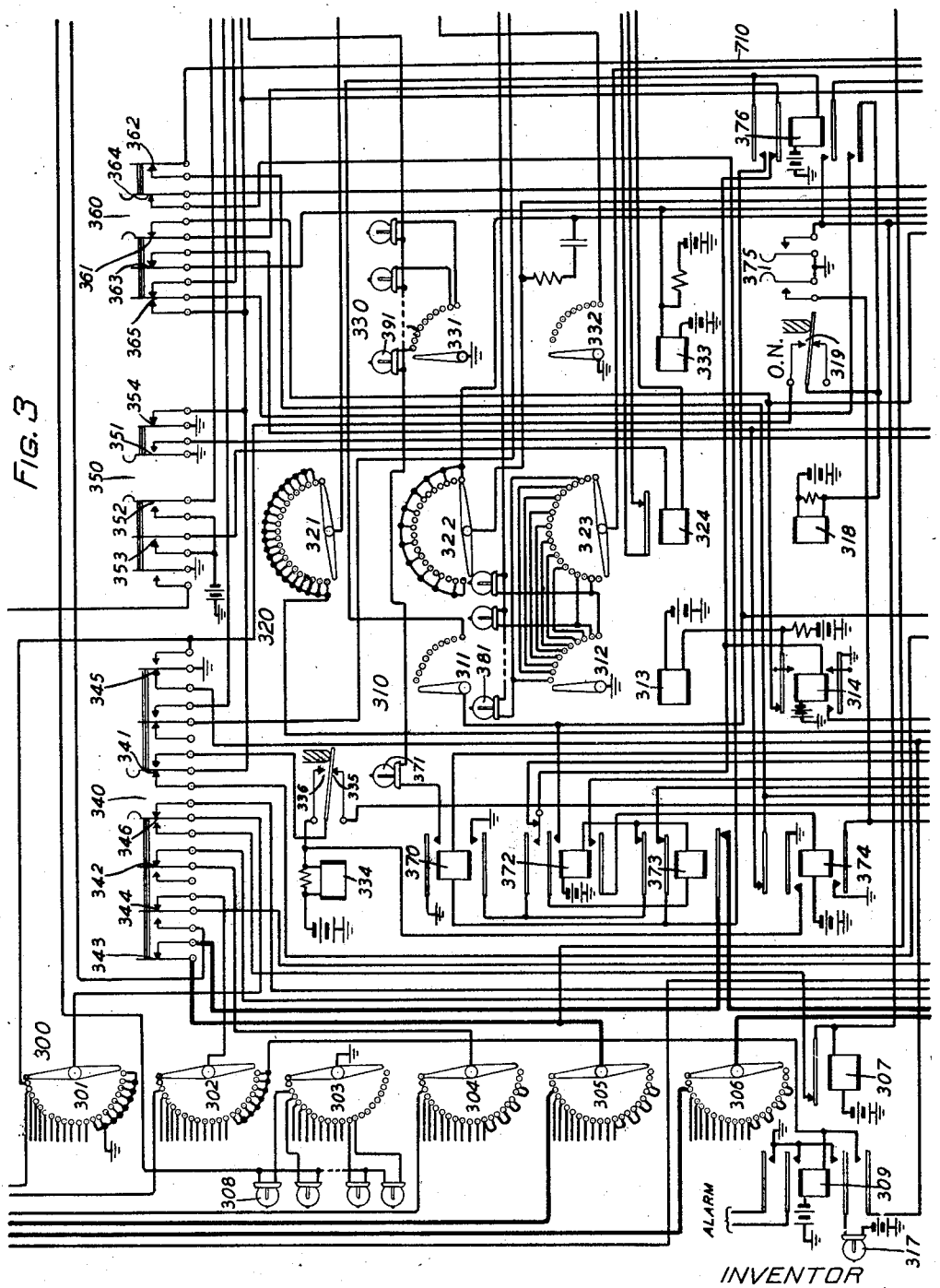
Figure 4:
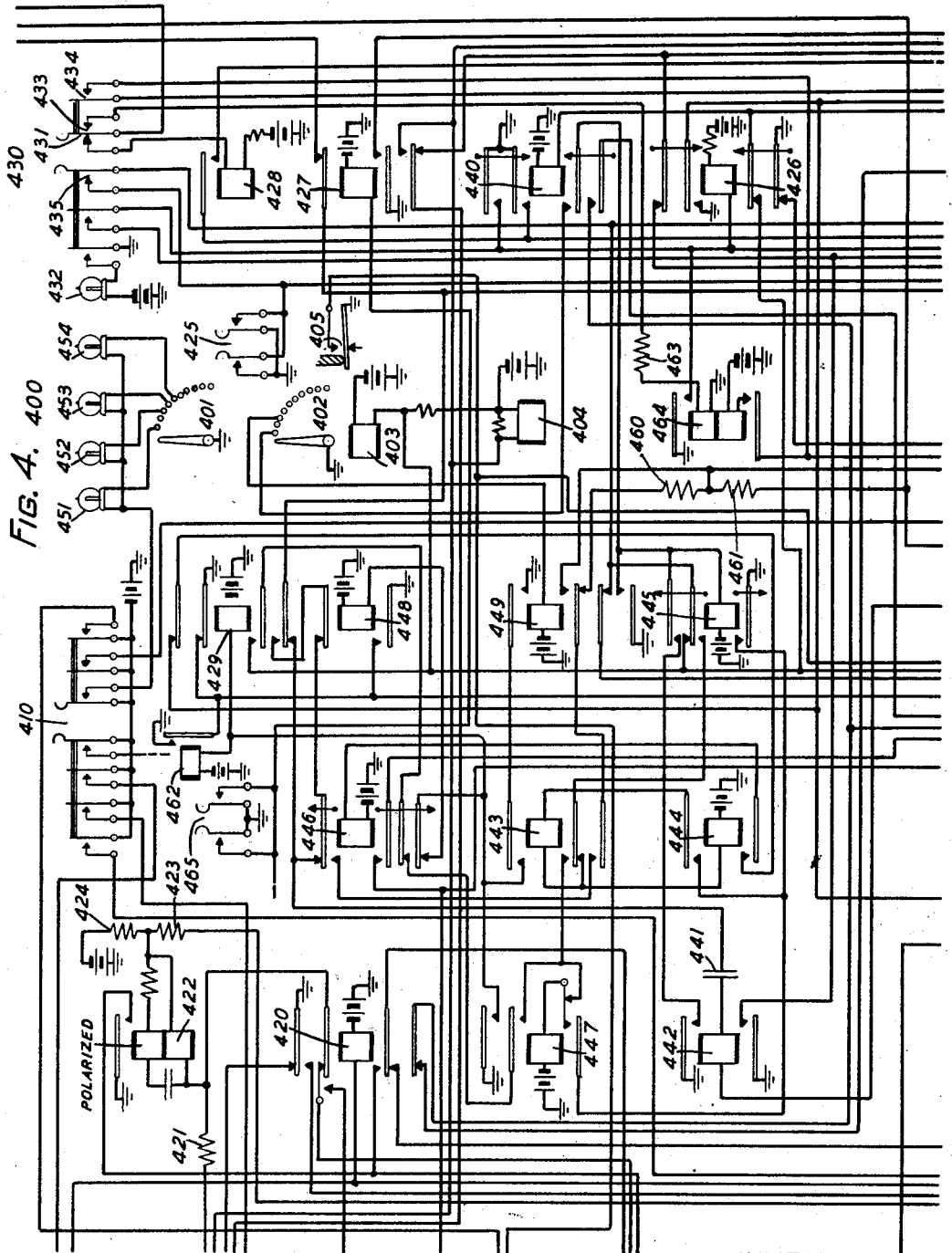
Figure 5:
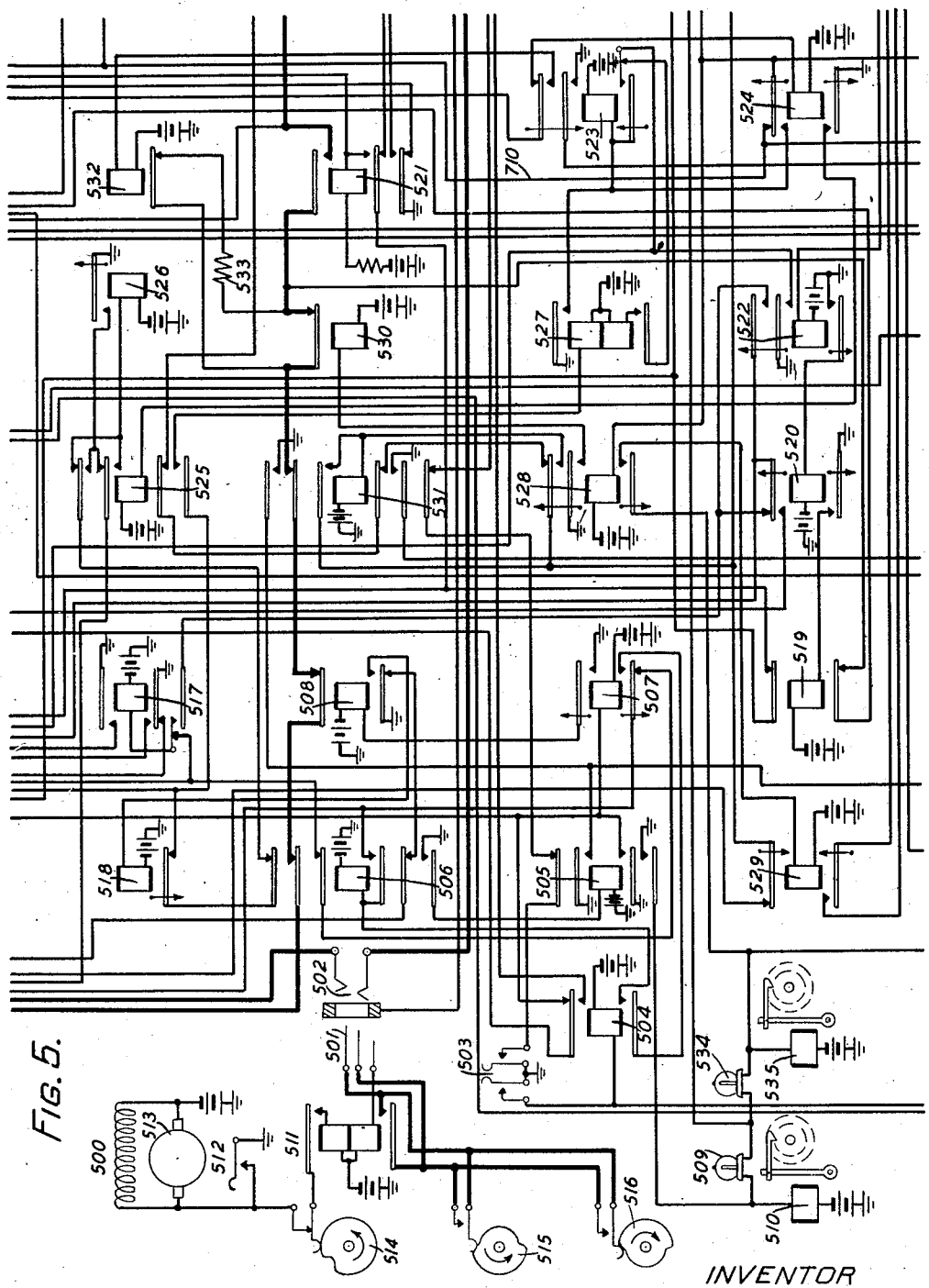
Figure 6:
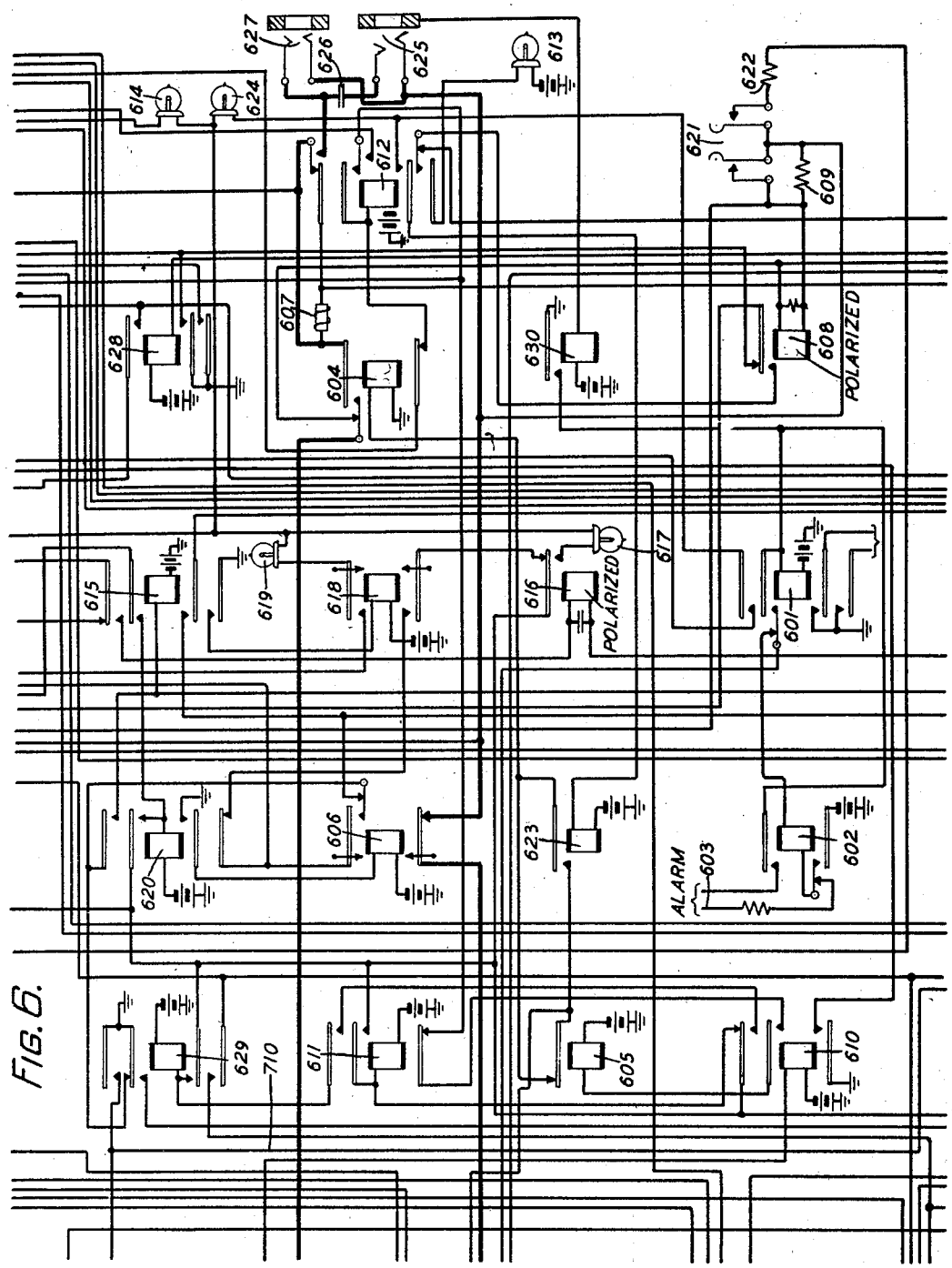

Assuming that the test set is in its normal idle condition, in order to prepare for a routine test of the connectors of an office, it is necessary first to insert plug 501 of the interrupter machine 500 into jack 502 of the test set. A circuit is thereby closed from ground through the winding of relay 604, back contact of relay 605, sleeves of jack 502 and plug 501, lower winding of relay 511 to battery. Relay 511 connects the tip and ring of plug 501 together thus completing the ring conductor through the test set. Key 512 is also closed to start the motor 513 which controls the cams 514, 515 and 516. Key 350 is operated to supply battery and ground for various purposes. It also operates certain relays to prepare the test set for functioning. At contact 351 it closes a circuit for relay 709 which normally holds the circuit of relay 701 open. At contact 354 it closes a circuit for relay 507 over the back contacts of relay 504 and contact 341 of key 340. Relay 507 in turn closes an obvious circuit for relay 508 and relay 508 closes a circuit for relay 518. At contact 354 key 350 also closes a circuit over the back contact of relay 523 through the winding of relay 524. Relay 524 closes a circuit for relay 525. Key 503 is then operated which operates relay 504. Relay 504 opens the circuit of relay 507, but relay 507 is held operated for a time due to its slow to release character. It also closes a circuit from ground over the right contact of key 503, upper back contact of relay 505, outer lower back contact of relay 531, normal contact of relay 601 through the winding and normal contact of relay 602 to conductor 603 and the time alarm mechanism. Immediately after the operation of key 503, key 375 is operated and released twice, operating magnet 307 in an obvious circuit to advance switch 300 into association with the first test selector. Display key 410 is also operated. The test set is now in condition to start operation.

Assuming that the test selector of Fig. 1 is connected, as shown, to the first working set of terminals of switch 300, a test is first made to determine whether the test selector is busy or idle. The operation of key 375 served to hold relay 507 operated in an obvious circuit. This relay prepares a circuit from battery through the winding of relay 506, lower contact of relay 504, lower front contact of relay 507, contact 342 of key 340, brush 304 to conductor 116. If the test selector is busy this conductor will be grounded as will be shown hereinafter and relay 506 will operate before relay 507, which is slow to release, opens its contact. Relay 506 immediately operates relay 505 which in turn closes a holding circuit for relay 507 preventing its release. Relay 506 opens a number of circuits to prevent interference with the test selector. Relay 505 opens the timing circuit including relay 602 and closes an obvious circuit for lamp 509 and register 510 to indicate and record the fact that the test selector was encountered busy. Relay 505 also initiates a timing operation by the closure of a circuit from ground over its upper front contact, normal contact of relay 701 winding of relay 700 to battery. Relay 700 opens the circuit of relay 709 which was operated by the operation of key 350. A circuit is closed after an interval from battery through the winding of relay 701, back contact of relay 709, contact 351 of key 350 to ground. Relay 701 locks over its uppermost contact under the control of relay 505. It also connects interrupter 702 over the lowermost contact of relay 701, back contact of relay 705 to the winding of relay 704. Relay 704 operates on the next closure of the interrupter contact and locks through the winding of relay 705 to ground at the middle lower contact of relay 701. Relay 705 does not operate until the interrupter opens its contact. With relay 705 operated the next closure of the interrupter 702 completes a circuit over the back contact of relay 707 to the winding of relay 706 and battery. Relay 706 locks through the winding of relay 707 under the control of relay 701 and relay 707 operates when the interrupter opens. With relays 705 and 707 operated the following closure of the interrupter operates relay 708 over the normal contact of that relay. Relay 708 also locks under the control of relay 701 and connects ground to the alarm circuit over its upper contacts.

In response to this alarm the attendant may operate key 375 to advance switch 300 to its next position. If the selector connected with in this position is idle, relay 506 will release, in turn releasing relays 505 and 507. Relay 505 releases the timing relays 701, and 704 to 708 inclusive, and reoperates relay 709. The release of relay 708 silences the alarm. If the second test selector is also busy, relay 506 is held operated and the alarm continues.

Assuming that the first test selector is idle, when switch 300 engages with it, relay 507 releases without operating relay 506 and releases relays 508 and 518. When relay 507 closes its back contact its connects relay 517 over the normal contact of relay 517, inner upper contact of relay 506, back contact of relay 507, contact 342 of key 340, and brush 304 to conductor 116. Relay 508 in releasing completes a circuit for relay 101 of the test selector which may be traced from battery through the upper winding of relay 101, middle upper back contact of relay 105, ring conductor 117, brush 305, contact 343 of key 340, lower contact of relay 373, tip of jack 502 and plug 501, lower contact of relay 511, ring of plug 501 and jack 502, back contact of relay 606, lowermost back contact of relay 420, front contact of relay 604, brush 322 in normal position, lower contact of relay 519, back contact of relay 530, upper back contacts of relays 531 and 508, middle upper contact of relay 506, brush 306, tip conductor 118, uppermost back contact of relay 105, lower winding of relay 101, eleventh rotary step contact 114 to ground. Relay 101 operates in this circuit closing a circuit from ground at the lowermost contact of relay 105, front contact of relay 101, winding of relay 102 to battery. Relay 102 prepares the operating circuit for the test selector and connects ground to conductor 116 to mark the selector busy. The connection of ground to conductor 116 also completes the circuit of relay 517 which now operates. Relay 508 in releasing also connected ground over its lower back contact, back contact of relay 506, contact 344 of key 340, brush 302, conductor 119, to the winding of relay 106 and battery. Relay 106 connects conductor 120 to the sleeve brush of selector 100 and connects conductor 121 to the winding of rotary magnet 107 in preparation for controlling the rotation of the selector. Relay 106 also connects ground to incoming sleeve conductor 122 to mark the switch busy to other selectors.

Relay 517 in operation closes a locking circuit for itself over its alternate contact, back contact of relay 520, and contact 345 of key 340 to ground. The operation of relay 517 also closes a circuit from ground at the inner lower front contact of relay 517, normal contacts of relay 372, winding of relay 314 to battery and in parallel with relay 314 over the back contact of relay 376, contact 361 of key 360, back contact of relay 314, winding of magnet 313 to battery. Relay 314 being slow to operate, magnet 313 operates and is then released by the operation of relay 314 to advance selector 310 one step. With switch 310 advanced, ground is supplied for lighting lamp 381 corresponding to the first selector level. It also connects ground to the third terminal of brush 323.

With relay 314 operated, as described above, it connects ground over its lower contact, inner back contact of relay 521, inner lower back contact of relay 420, back contact of magnet 324, normal contact of relay 420 to resistance 421 and contact 352 of key 350 to battery, and to the lower winding of relay 422. It also connects ground over its lower contact, upper contact of relay 519 to resistance 423 and the lower winding of relay 422 and through resistances 423 and 424 to battery. Relay 422 has been held unoperated by the connection of battery through the resistances 421 and 424 to the two sides of its lower winding. With resistance 421 shunted by direct ground and resistance 424 shunted by ground through resistance 423, current flows in the lower winding of relay 422 and is in a direction to cause its operation.

With relay 422 operated a circuit is closed from ground at its contact, winding of magnet 324, to battery over contact 353 of key 350. Magnet 324 operates in this circuit removing the shunt from resistance 421 and releasing relay 422. Relay 422 in releasing, in turn releases magnet 324. Brush 322 is now engaging its second terminal. It will be remembered that the tip of the loop circuit for relay 101 of the test selector extended over brush 322. Since the second terminal of brush 322 is unconnected, the circuit of 101 is now open and that relay releases. With relay 101 released a circuit is closed from ground at the lowermost contact of relay 105, back contact of relay 101, upper front contact of relay 102, winding of relay 103, winding of vertical magnet 108 to battery. Magnet 108, steps the test selector to its first level. As soon as the selector steps off normal, a circuit is completed from battery through the winding of relay 104, off-normal contact 111, alternate contact of relay 103, to ground at the lower front contact of relay 102. A circuit also exists for relay 104 over contact 111, contact of rotary magnet 107, winding of relay 105, middle upper front contact of relay 106, lower contact of 102 to ground. With relay 103 operated, however, relay 105 is shunted by ground over the lower contact of relay 102, and the contact of relay 103, as well as by ground over the lower back contact of relay 105 and the upper contact of relay 104, so that only relay 104 operates at this time.

The release of magnet 324 again connects ground in shunt of resistance 421 and relay 422 reoperates the magnet 324 to step switch 320 to its third terminal. At this time ground over brush 312 is extended over brush 323 to the winding of relay 521 and battery. Relay 521 operates and locks to the lower contact of relay 314, disconnecting ground from resistance 421 and preventing the reoperation of relay 422. Relay 521 closes a shunt around brush 322 and its terminal bank thus preventing a further opening of the loop circuit. Brush 322 also recloses the loop circuit in position 3.

The reclosure of the loop circuit permits relay 101 to reoperate, opening the circuit of relay 103, which is slow to release. After an interval relay 103 opens its alternate contact opening one shunt around relay 105.

The operation of relay 521 closes a circuit at its outer lower front contact for relay 420. Relay 420 at its uppermost front contact closes a circuit for relay 522. Relay 522 closes an obvious circuit for relay 520. It also connects ground to the off-normal contacts of brush 321, completing a circuit over the alternate contact of relay 420, back contact of magnet 324, lower front contact of relay 420, winding of magnet 324 to battery at contact 353 of key 350. Switch 320 is restored in this circuit which is opened by brush 321 when the switch reaches normal.

Relay 522 also closes a substitute holding circuit for relay 517. Relay 520 closes an obvious circuit for relay 519, which opens the portion of the loop circuit extending to brush 322 and also disconnects ground from resistances 423 and 424. At its lowermost contact relay 420 opens one path for the loop circuit which now extends over the upper front contact of relay 604 through retard coil 607, right winding of repeating coil 801, winding of relay 608, resistance 609 to the lower contact in relay 606.

Following the release of relay 103, a circuit is closed from battery through the winding of rotary magnet 107, lower contact of relay 104, normal contact of relay 103 to ground at the lower contact of relay 102, stepping the test selector into association with the first connector. A parallel circuit is closed from ground at the lower contact of relay 102, over the normal contact of relay 103, lower front contact or relay 104, outer lower front contact of relay 106, conductor 121, brush 301, contact 346 of key 340, inner upper front contact of relay 525, winding of relay 526 to battery. Relay 526 in operating closes a circuit over the outer upper front contacts of relay 525, uppermost back contact of relay 506, back contact of relay 518, lower front contact of relay 525, upper winding of relay 527 to battery. Relay 527 locks over its lower winding and lower contact and the normal contact of relay 523 to ground at the inner upper contact of relay 522. Relay 527 closes an obvious circuit for relay 523 which locks over its lower contact to ground at the inner upper contact of relay 522. Relay 523 is slow to operate and does not open the circuit of relay 527 for an interval. Relay 526 also closes a circuit from ground at its contact over the outer upper front contact of relay 525, uppermost back contact of relay 506, contact of relay 518, back contact of relay 374, contact 363 of key 360, winding of stepping magnet 333 to battery. Magnet 333 steps switch 330 to its first position, lighting lamp 391 which corresponds to the first rotary position of the test selector. Lamps 381 and 391 together indicate that the first selector in the first level is undergoing test.

At the same time relay 527 closes a circuit from ground over its upper contact, upper front contacts of relay 524, winding of relay 528 to battery. Relay 528 in turn operates relay 530 which opens one point in the loop circuit which is shunted over the lower contact of relay 532 and resistance 533. The operation of relay 523 also opens the circuit of relay 524 which is slow to release. During the releasing time of relay 524 a test circuit is provided for testing whether the connector is busy. This test circuit may be traced from battery through the winding of relay 531, outer upper front contact of relay 528, back contact of relay 529, conductor 120, outer upper contact of relay 106, to sleeve brush of the test selector 100. If the connector is busy ground will be connected to conductor 203. Relay 531 will operate and lock over its inner upper front contact to this ground independent of relay 528. Relay 523 also closes a circuit from battery through the winding of relay 532, outer upper front contact of relay 523 to ground at contact 354 of key 350. Since relay 523 is slow to operate, relay 532 does not operate for an appreciable interval during which the shunt is held around the contact of relay 530. With relays 532 and 530 operated the loop circuit to the connector is opened. When relay 524 releases completely it opens the circuit of relay 525.

If relay 531 operates, this relay also opens the loop circuit to the connector to prevent interference with the existing conversation. It also closes a circuit from ground at its upper front contact, normal contact of relay 701, winding of relay 700 to battery, to initiate the timing operation described above. If key 703 is operated the test set will pass by busy connectors and only test those which are idle. Therefore with key 703 operated the operation of relay 701 closes a circuit from ground, lower front contact of relay 531, inner lower contact of relay 701, left contact of key 203 to conductor 710 and thence (1) over the back contact of relay 524 to the winding of relay 528 and battery; (2) conductor 710, over contact 362 of key 360, back contact of relay 374, contact 363 of key 360, winding of magnet 333 and battery; (3) over contact 362 of key 360, contact of relay 518, uppermost contact of relay 506, outer upper back contact of relay 525 to winding of relay 526 and battery. Magnet 333 operates and prepares to step switch 330 to its next terminal. Relay 526 connects ground over its contact, inner upper back contact of relay 525, contact 346 of key 340, brush 301, conductor 121, lowermost front contact of relay 106, winding of rotary magnet 107 of the test selector and battery, advancing the test selector to the next connector.

Relay 528 in operating closes a circuit from battery through the winding of relay 529, lower contact of relay 528, inner upper front contact of relay 701 to ground at the lower front contact of relay 531. Relay 529 operates, opening the circuit of relay 531 which removes ground from the three circuits traced over the pass-busy key 703 as well as the circuit of relay 529, thus releasing relays 526, 528 and 529 as well as magnet 333. Relay 528, being slow to release, maintains the circuit for relay 531 over the front contact of relay 528 and the back contact of relay 529 to conductor 120 to test whether the next connector is busy or idle. In releasing, magnet 333 steps switch 330 to the set of terminals corresponding to the rotary position of the connector in the bank of the test selector. With relay 701 operated, a circuit is closed from ground at the lower front contact of relay 531, inner upper front contact of relay 701 to lamp 534 and register 535 indicating and recording the fact that the connector has been encountered in a busy condition.

If the pass-busy key 703 is not operated the timing circuit will continue to function until the operation of relay 708 causes the alarm to sound. The attendant will then operate key 425 in turn operating relay 802. Relay 802 connects ground to conductor 710, operating relays 528 and 526 and magnet 333 which function in the same manner as above described.

If the first connector is idle relay 531 does not operate, and the release of relay 524 in turn causes the release of relays 528 and 525. The operation of the rotary magnet 107 in stepping the selector to its first rotary position opens the circuit of relay 104. When magnet 107 recloses its contact the circuit of relay 104 extends from battery through its winding, contact 111, back contact of magnet 107, winding of relay 105, middle upper front contact of relay 106, lower contact of relay 102 to ground. Relay 105 operates in this circuit but relay 104 cannot operate in series with relay 105. Relay 105 closes a locking circuit for itself which may be traced from battery through the winding of relay 104, contact 111, lower front contact of relay 105, inner lower front contact of relay 106, winding of relay 105, middle upper front contact of relay 106, conductor 116, brush 304, contact 342 of key 340, back contact of relay 507, inner upper contact of relay 506, inner upper contact of relay 373, winding of relay 370 to ground at the upper contact of relay 517. Relay 370 is prevented from operating in this circuit as long as relay 102 remains operated, by ground connected to conductor 116 over the lower contact of relay 102. Relay 105 in operating, disconnects the loop circuit from relay 101 and extends it to the tip and ring brushes and thence to the connector. Relay 101 releases and after an interval relay 102 also releases permitting relay 370 to operate. Relay 370 in operating lights guard lamp 371 and also closes a circuit from ground at its lower contact, outer upper contact of relay 373, winding of relay 372 to battery. Relay 372 operates and locks through the winding of relay 373, inner upper contact of relay 372, upper front contact of relay 520 to ground at contact 345 of key 340. Relay 373 cannot operate as long as the operating circuit of relay 372 is maintained by relay 370. Relay 372 at its upper contact transfers the holding circuit for relay 314 from relay 517 to relay 370.

When relays 528 and 530 have released in response to the release of relay 524 as previously described, and relay 105 has operated to extend the tip and ring conductors through to the connector, a circuit is established for relay 201, extending from ground through the upper winding of relay 201, upper normal contact of relay 217, tip brush of selector 100, uppermost front contact of relay 105 to conductor 118 and then as traced for the circuit of relay 101 except that relay 521 is now operated closing a shunt around brush 322, and relay 420 is operated opening the shunt around retard coil 607, repeating coil 801, relay 608 and resistance 609, back to conductor 117, middle upper front contact of relay 105, ring brush of the selector 100, lower normal contact of relay 217, lower winding of relay 201 to battery. Relay 201 operates in turn closing an obvious circuit for relay 202. Relay 202 connects ground over its inner upper contact to conductor 203, and thus to conductor 120, back contact of relay 529, back contact of relay 528, inner lower back contact of relay 531, lower back contact of relay 525 winding of relay 610 to battery. Relay 610 in operating closes a circuit from battery through the winding of relay 605, inner upper front contact of relay 610, back contact of relay 611, upper back contact of relay 426, lower back contact of relay 427, contact 354 of key 350 to ground. Relay 605 opens the circuit of relays 604 and 511. Relay 604 extends the loop circuit over its upper normal contact through the winding of relay 608 and resistance 609 to the back contact of relay 606, thus removing the retard coil 607 and repeating coil 801 from the circuit. With relay 604 released relay 612 is operated over the lower contact of relay 604, lower back contact of relay 427 to ground at contact 354 of key 350. Relay 612 locks over its middle upper front contact, upper back contact of relay 426, lower back contact of relay 427 to ground at contact 354 of key 350.

Referring to the interrupter machine 500, cams 514 and 515 are carried on the same shaft and rotate together so that immediately after cam 514 opens its contacts cam 515 also opens its contacts for a definite period. Cam 516 is carried on a shaft which is geared to the other cam shaft so that it will make ten revolutions during the time that the contact of cam 515 is open. The opening of the circuit of relay 511 above described, may not cause the immediate release of that relay since the relay is locked over the contact of cam 514 to ground at key 512 except in the open position of the cam. When cam 514 opens its contact relay 511 releases and cannot reoperate. Shortly thereafter cam 515 also opens its contact leaving the circuit of relay 201 dependent upon the cam 516 which now opens the circuit of that relay ten times.

Relay 201 in releasing at each opening of this circuit, closes a circuit from ground over its back contact, lower front contact of relay 202, normal contact 205, winding of relay 208, winding of vertical magnet 209 to battery. At the first vertical step, contact 205 is opened and contact 204 closed. Relay 208 operates in the circuit of magnet 209 and being slow to release maintains the circuit for magnet 209 over its front contact and off-normal contact 204. The connector is thereby raised to its tenth level under the control of cam 516. At the end of the tenth pulse cam 515 closes a shunt around the contact of cam 516 and relay 201 remains operated for an appreciable interval during which relay 208 releases preparing the circuit for the rotary magnet. When cam 515 again opens its contact cam 516 transmits a second series of ten impulses to the connector. Relay 201 now closes a circuit from ground over its back contact, front contact of relay 202, off-normal contact 204, back contact of relay 208, outer upper back contact of relay 213, inner lower back contact of relay 211, winding of rotary magnet 212 to battery, advancing the selector to the tenth terminal of the tenth level, or terminal No. 99. Relay 210 is operated in parallel with the rotary magnet and by its slow to release character and its holding armature remains operated throughout the reception of the rotary impulses.

It also holds its contacts closed for an interval thereafter during which the test circuit is closed from the sleeve-brush of the connector, lower alternate contact of relay 210, middle lower back contact of relay 211, winding 213 to battery. If the called lines is busy, relay 213 operates to cause the application of a busy signal. Assuming that the busy key 430 is normal relay 428 is connected over contact 431 of key 430, and conductor 222, to the sleeve terminal of the terminal set No. 99 and relay 213 is not operated. As soon as relay 210 closes its back contact the circuit of relay 428 is extended from the sleeve brush of selector 200, lower back contact of relay 210, lower winding of relay 211, inner upper contact of relay 213 to ground at the inner upper contact of relay 202. Relay 211 operates and locks through its upper winding and innermost upper contact to ground at the outer upper contact of relay 202. Relay 211 connects ground over its next to the inner upper contact to the sleeve brush operating relay 428 in the test set. It also closes a circuit from interrupter 218, lower front contact of relay 211, normal contact of relay 215, lower back contact of relay 216, to the winding of relay 215 and battery. Relay 215 operates and locks over the lower back contact of relay 216, upper alternate contact of relay 215 to ground at the inner upper contact of relay 202.

Relay 608 which was inserted in the pulsing circuit is polarized. If the battery is reversed at the connector, when it is seized relay 608 operates in the pulsing circuit and removes ground from the contact of relay 428, rendering that relay ineffective. Assuming that the polarity is correct and that relay 608 is not operated, the operation of relay 428 as above described closes a circuit from ground at the inner upper contact of relay 429, back contact of relay 608, contact of relay 428, contact 811 of key 810 and thence through the winding of relay 440 to battery, and in parallel therewith over the inner lower contact of relay 426 to the winding of magnet 403 and battery. Magnet 403 steps switch 400 to its first off-normal position. Relay 440 is slow to operate and after an interval connects ground to the armature of relay 428, to hold relay 440 and magnet 403 operated. Relay 440 also closes a circuit for relay 426 which opens the circuit of magnet 403. With brush 401 in its first off-normal position lamp 451 is lighted. With brush 402 in its first off-normal position ground is connected over brush 402, inner lower contact of relay 440, winding of relay 445 to battery. Relay 445 opens one circuit of magnet 403 and prepares other circuits. Relay 440 also closes a shunt around resistance 609, reducing the resistance of the loop circuit. Relay 426 opens the locking circuit of relay 612 and the operating circuit for relay 605. Relay 605 recloses the circuit of relay 604 which now opens the circuit of relay 612, releasing that relay. With relay 604 operated the loop circuit again extends through retard coil 607, repeating coil 801 and the winding of relay 608 while relay 511 reoperates in series with relay 604 closing the loop circuit.

These operations take place in response to the seizure of the test line terminals. In the meantime the connector is prepared for the application of ringing current as above described and the circuit for this ringing current may be traced, from ringing current source 219, front contact of relay 215, upper winding of relay 216, inner upper back contact of relay 216, next to the outer upper contact of relay 211, ring brush of the connector 200, conductor 221, back contact of relay 615, winding of relay 442, condenser 441, lower back contact of relay 429, upper back contact of relay 427, conductor 220, tip brush of connector 200, uppermost contact of relay 211, uppermost back contact of relay 216 to ground. Relay 442 operates in response to the first application of ringing current and connects ground to the winding of relay 445 and to the winding of relay 803 which is connected with the output terminal of the amplifier 800. Ringing induction is normally transmitted back to the calling subscriber through condenser 223 and talking condensers 224 and 225. In the present case this induced current is transmitted over the loop circuit as previously traced to the winding of repeating coil 801. It is then transmitted by means of input coil 804 to the amplifier 800. If the induced ringing current is received properly it will be amplified by amplifier 800 and cause the operation of relay 803. With relay 803 operated, a circuit is closed from ground over the contact of relay 803, inner upper front contact of relay 445, back contact of relay 443, winding of relay 444 to battery. Relay 444 locks through the winding of relay 443 to ground at the lower contact of relay 445 but relay 443 cannot operate until relay 803 releases at the end of the first application of ringing current. Relay 444 closes a circuit from battery through the winding of relay 446, lower contact of relay 444, outer upper contact of relay 429, upper front contact of relay 426 to ground.

When relay 442 reoperates in the next ringing period permitting relay 803 to also reoperate, a circuit is closed from ground over the front contact of relay 803, inner upper front contact of relay 445, inner lower front contact of relay 443, normal contact and winding of relay 447 to battery. Relay 447 locks to the lower contact of relay 445. Relay 447, in operating, closes a circuit for relays 429 and 462 which operate. Relay 429 in operating connects the tip conductor 220 over the upper back contact of relay 427, outer lower front contact of relay 429, upper contact of relay 448, upper front contact of relay 446, outer lower front contact of relay 443, inner lower back contact of relay 449, resistances 460 and 461 to the ring conductor 221. This is a direct current path and includes just too much resistance to permit the operation of relay 216. Relay 429 opens the circuit of relay 446 which is slow to release and therefore maintains this circuit during its release period. With relay 446 released, conductor 220 is again connected to condenser 441, and relay 442. If relay 216 should operate falsely no further ringing current would be received and the test would be blocked.

Assuming that relay 216 does not operate the next application of ringing current operating relay 803, closes a circuit from ground at the contact of relay 803, inner upper front contact of relay 445, inner lower front contact of relay 443, inner upper contact of relay 447, inner lower back contact of relay 446, inner lower front contact of relay 429, winding of magnet 403 to battery. Magnet 403 steps switch 400 to its second position. In this position the circuit of relay 445 is opened but relay 442 holds relay 445 operated until the end of the ringing period. With relay 445 released, relays 447, 429, 443 and 444 all release.

In the next ringing period, relays 442 and 803 operate. Relay 803 closes a circuit from ground at its front contact, upper back contact of relay 445, winding of magnet 403 to battery, advancing switch 400 to position 3. In position 3, brush 401 closes the circuit of lamp 452 indicating that a test is being made of the operation of the trip relay of the connector, and brush 402 closes a circuit from ground through the winding of relay 449 to battery. Relay 449 closes an obvious circuit for reoperating relay 445. With relay 445 operated a circuit is closed from ground at the front contact of relay 803, inner upper front contact of relay 445, lower back contact of relay 443, to the winding of relay 444. When relay 803 releases at the end of the ringing period, relay 443 also operates. Relay 444 again operates relay 446. Relay 443 in operating closes a circuit from ground at the upper contact of relay 449 over the upper contact of relay 443 in parallel through the windings of relays 429 and 462 to battery. Relays 462 and 429 operate. Relay 429 in operating releases relay 446 and for the release period of relay 446 conductor 220 is connected over the back contact of relay 427, outer lower front contact of relay 429, back contact of relay 448, upper front contact of relay 446, outer lower front contact of relay 443, inner lower front contact of relay 449 through resistance 461 to conductor 221. The current flowing in this circuit during the silent period of the ringing machine is of the proper value to operate trip relay 216 of the connector.

Relay 216 in operating locks through its lower winding to ground at the outer upper contact of relay 202. It also connects battery through the upper winding of relay 217, uppermost front contact of relay 216, uppermost front contact of relay 211 to conductor 220, and ground through the lower winding of relay 217, middle upper front contact of relay 216, next to the uppermost front contact of relay 211 to conductor 221. Relay 217 operates in series with resistance 461 reversing the connection of battery and ground through the windings of relay 201 to the loop circuit. Relay 608 now operates, closing a circut from ground at the contact of relay 462, front contact of relay 608, lower normal contact of relay 612, contact 812 of key 810, winding of relay 615 to battery. Relay 615 closes a loop circuit for relay 217 extending from the conductor 220, upper back contact of relay 427, right winding of repeating coil 805, winding of relay 616, outer upper front contact of relay 615 to conductor 221.

When relay 446 releases a cricuit is closed from battery through the winding of relay 448, outer lower back contact of relay 446, upper front contact of relay 443 to ground at the upper front contact of relay 449. Relay 448 prevents the extension of the tip and ring conductors to relay 442 if ringing should not have been properly tripped. Relay 616 is polarized to test whether the battery and ground supplied to the windings of relay 216 are properly connected to conductors 220 and 221. If the battery supply is reversed, relay 616 operates, lighting lamp 617 over a circuit to ground at the upper front contact of relay 426, and opening a circuit for advancing switch 400. If the connection were correct relay 616 would not operate. Relay 615 in operating closes an obvious circuit for relay 618 which operates after interval, lighting lamp 619 in a circuit to ground at contact 405 of switch 400. Relay 618 also closes a circuit from battery through the winding of magnet 403, back contact of relay 620, lower contact of relay 618, back contact of relay 616 to ground at the upper front contact of relay 426. Magnet 403 advances switch 400 to its fourth position, lighting lamp 453 to indicate that the tone test is in progress and releasing relays 449, 445, 443 and 444.

The operation of relay 615 also closes a circuit from battery through the winding of relay 806, inner lower front contact of relay 615, normal contacts of relay 606 to ground at the back contact of relay 629. Relay 806 in operating removes the shunt from resistance 807, connects resistance 808 in series with one winding of repeating coil 801 and transformer 804, connects resistance 809 in parallel with the same windings, and short-circuits resistance 820. These adjustments automatically change the tuning of amplifier 800 from the frequency of the ringing current previously passed through it to that of the mechanical oscillator 825. Relay 806 connects battery through resistances 821 and 822 in parallel, and resistance 823 to the left windings of repeating coil 824 and opposite contacts of the mechanical oscillator 825. It also connects battery over the back contact of relay 826 to the winding of magnet 827 of the oscillator. The circuit of this magnet extends to ground at the upper back contact of relay 826. Battery is connected to the winding of relay 826 at the same time that it is connected to magnet 827 and the circuit of relay 826 extends to ground over the normal contact of relay 606 and the upper back contact of relay 629. Relay 826 operates immediately after the oscillator is started, opening the start circuit for magnet 827 which is now intermittently operated in a circuit from battery through resistance 828, and resistances 829 and 830 in parallel, winding of magnet 827, lower left contact of the oscillator to ground through the oscillating bar which receives ground from contact with the frame. Magnet 827 in operating, attracts the bar and breaks its own circuit. The oscillator in vibrating connects ground at one limit of its circuit over the bar through its upper left contact and the lower left winding of repeating coil 824 and thence through rheostat 823 and resistances 821 and 822 in parallel to battery at the inner upper contact of relay 806 and at the other limit of its stroke over the right contact of the oscillator through the upper left winding of repeating coil 824, to battery through rheostat 823 as above traced. The intermittent current flowing through the left winding of repeating coil 824 is of 1000 cycle frequency and is induced in the right winding of coil 824 whence it is transmitted through repeating coil 805 over the circuit above traced to the windings of relay 217. This tone is further transmitted through condenser 224, tip brush of selector 100, uppermost front contact of relay 105, brush 306, middle upper contact of relay 506, upper contact of relay 508, upper back contact of relay 531, back contact of relay 530, upper front contact of relay 521, upper front contact of relay 604, retard coil 607, right winding of repeating coil 801, winding of relay 608, resistance 609, back contact of relay 606, ring of jack 502 and plug 501, lower front contact of relay 511, tip of plug 501 and jack 502, lower back contact of relay 373, contact 343 of key 340, brush 305, middle upper front contact of relay 105, ring brush of selector 100 and condenser 225 to relay 217. Tone is therefore transmitted from oscillator 825 through selector 200 and test selector 100 to the amplifier 800. Relay 803 is now connected between ground at the front contact of relay 826 and the output terminal of the amplifier 800 so that, if the tone is transmitted to the switch circuit satisfactorily and at a sufficient value, relay 803 operates, closing a circuit from ground over its front contact, outer lower back contact of relay 449, inner upper front contact of relay 615 to the winding of relay 620 and battery. Relay 620 locks to ground at the upper front contact of relay 426 and in turn operates relay 606. It also closes a holding circuit for relay 615 and opens the circuit formerly closed for stepping magnet 403. Relay 803 also closes a circuit from ground at its front contact, back contact of relay 445 to the winding of magnet 403 advancing switch 400 to its fifth position, in which position lamp 454 is lighted to indicate that the connector is being tested for its response to delay of release by the called party.

The operation of relay 606 releases relay 806 and opens the end of the tone circuit above traced which is connected to the amplifier 800. This act simulates the restoration of the receiver by the calling party. The release of relay 806 restores the amplifier to its previous condition and stops the mechanical oscillator 825. The opening of the tone circuit releases relay 201 which in turn releases relay 202 removing ground at one point from conductor 203. Relay 217 remains operated under the control of relay 615 and at its uppermost front contact holds relay 211 operated to prevent the energization of the release magnet. Relay 216 also remains locked to the uppermost front contact of relay 217, preventing the reapplication of ringing current to the test circuit. Relay 202 is slow to release so that during its releasing time ground is connected over the back contact of relay 201, lower front contact of relay 202, off-normal contact 204, back contact of relay 208, outer upper back contact of relay 213 to the winding of relay 210 and battery. Relay 210 operates and disconnects ground from the conductor 203 at a second point, thus completing the removal of ground from conductor 203. When relay 202 completely releases, relay 210 also releases and when it recloses its back contact again connects ground to conductor 203 over the next to the inner upper contact of relay 211 by way of the lowermost back contact of relay 210, lower winding of relay 211 and the inner upper back contact of relay 213. This momentary removal of ground from conductor 203 would ordinarily result in the release of the earlier selectors in the train. Since relay 106 is operated, ground is momentarily disconnected from conductor 120 resulting in the momentary release and subsequent reoperation of relay 610. With relay 610 released a circuit is closed from battery through the winding of relay 611, back contact of relay 610 to ground at the upper front contact of relay 426. Relay 611 operates and locks to ground at the upper front contact of relay 426. It also closes a circuit from battery through the winding of relay 629, outer upper contact of relay 611 to the outer upper front contact of relay 610. When relay 610 reoperates this circuit is completed over the front contact of relay 610 to ground at relay 426. Relay 629 also locks under the control of relay 426. Relay 610 in operating opens the circuit of relay 605, reclosing the circuit for relay 604. Relay 629 closes a circuit from battery through the winding of magnet 333, contact 363 of key 360, back contact of relay 374, contact 362 of key 360, uppermost front contact of relay 629 to ground, advancing switch 330 to its next position to indicate that the second selector in the level is about to be tested. Relay 629 also closes a circuit from battery through the winding of release magnet 404, upper back contact of relay 802, inner upper front contact of relay 629 to ground. The operation of release magnet 404 restores switch 400 to normal. It also closes a circuit from battery through the winding of relay 526, outer back contact of relay 525, uppermost back contact of relay 506, back contact of relay 518, contact 362 of key 360 to ground at the outer upper front contact of relay 629 and from battery through the winding of relay 528, back contact of relay 524 to ground at the outer upper front contact of relay 629. In addition relay 629 opens the holding circuit of relay 615 which releases in turn releasing relay 618.

Relay 526 in operating closes a circuit from ground at its contact, inner upper back contact of relay 525, contact 346 of key 340, brush 301, conductor 121, lowermost front contact of relay 106, winding of rotary magnet 107 to battery. Magnet 107 steps the test selector into engagement with the next connector. The release of relay 615 opens the circuit of relay 217 which releases in turn releasing relays 216 and 211. The release of these relays disconnects ground from conductor 222 and closes a circuit from battery through the winding of release magnet 207, vertical off-normal contact 206, lowermost back contact of relay 211, lower back contact of relay 202 to ground at the back contact of relay 201. The connector is restored to normal by the operation of the release magnet.

The removal of ground from conductor 222 releases relay 428 which in turn releases relays 440 and 426. Relay 426 opens the locking circuit for relays 629, 611 and 620 which also release. The test circuit is now ready to test the next connector.

If the connector either fails to remove ground from conductor 203 in response to the simulated restoration of the calling subscriber's switchhook, or fails to reconnect ground to that conductor the test cannot proceed and the operation of the timing relays causes the alarm to function.

Testing of the busy or idle condition of the next connector takes place over conductor 120, the operation of relay 610 serving to operate relay 605 and to initiate the transmission of pulses from the impulse generator 500 to the connector as above described.

After the test of each connector of the level, switch 330 is advanced and switch 400 released as above described. With switch 330 in its tenth position the operation of relay 446 during the pretrip test closes a circuit from ground over brush 332, inner lower front contact of relay 446, normal contact and winding of relay 831 to battery. Relay 831 locks over its upper front contact to ground at the upper front contact of relay 426. When relay 629 operates following the successful completion of the test of the tenth connector a circuit is closed from ground over brush 332, lowermost front contact of relay 629, lower front contact of relay 831, contact 364 of key 360 to the winding of relay 370. The other side of this winding is connected to ground at the upper front contact of relay 517 and therefore relay 370 is released. The release of relay 370 permits relay 373 to operate in the locking circuit of relay 372. The release of relay 370 also extinguishes lamp 371. Relay 373 opens the circuit of relay 370 and also opens the loop circuit to the test selector. With relay 373 operated the holding circuit for 105 is opened and that relay releases, closing a circuit from ground over its back contact, back contact of relay 101, back contact of relay 102, off-normal contact 112 to the winding of release magnet 109 and battery. The test selector is restored to normal under the control of the release magnet 109. Relay 370 in releasing also opens the circuit of relay 314 which in turn opens the locking circuit of relay 521 and releases relay 420. Relay 420 in turn releases relay 522 and relay 522 releases relays 519, 520 and 517. The release of relay 520 opens the circuit of relays 372 and 373 which now release.

With relay 373 released the loop circuit to the tip and ring of the test selector is restored and relay 101 reoperates in turn reoperating relay 102 which connects ground to conductor 116. Relay 517 reoperates. With relay 314 released the operation of relay 517 closes a circuit for magnet 313 over the back contact of relay 314, contact 361 of key 360, back contact of relay 376, normal contact of relay 372 to ground at the inner lower front contact of relay 517. Relay 314 is also energized in a branch of this circuit.

Magnet 313 steps switch 310 to its second terminal. The second level lamp (not shown) is lighted. In this position ground is connected over brush 312 to the fifth terminal of brush 323. Relays 314 and 422, resistances 421 and 423 and magnet 324 now function as previously described to transmit two impulses to relay 101 to advance the test selector to its second level. The connectors appearing in the second level are now tested in turn after which the test selector is restored to normal and then advanced to its third level.

Testing continues in this manner until the switch 310 is advanced to its tenth terminal for testing the connectors appearing in the tenth level. With brush 311 engaging its tenth terminal the operation of relay 520 following the positioning of the test selector closes a circuit from battery through the winding of relay 376, brush 311, upper front contact of relay 520 to ground at contact 345 of key 340. Relay 376 locks over its upper front contact to the same ground independent of brush 311. When relay 446 operates during the pretrip test of the tenth connector in this level, relay 831 is operated as above described. When the tenth connector has been tested relay 629 operates, connecting ground over brush 332 to the winding of relay 370, releasing that relay. Relay 373 then operates as above described causing the release of the test selector. Relays 314 and 521 are also released. Since relay 376 is now operated the release of relay 521 closes a circuit from ground at its outer lower back contact, inner lower front contact of relay 376, winding of magnet 307 to battery advancing switch 300 to its next terminal where the next test selector is tested for busy condition and the operations above described are repeated in connection with the next test selector. With relay 376 operated, the release of relay 420 closes a circuit from ground over its uppermost back contact, contact 365 of key 360, outer lower front contact of relay 376, winding of magnet 318 to battery, thus restoring switch 310 to normal. The release of relay 517 closes a circuit from battery through the winding of relay 374, lower front contact of relay 372 to ground at the inner lower back contact of relay 517. Relay 374 closes an obvious circuit for release magnet 334, restoring switch 330 to normal. Switch 400 is restored to normal in the manner above described. Relay 374 also closes a circuit for relay 507 to prepare for determining whether the test selector is busy or idle. The release of relay 520 also opens the circuit of relay 373 to restore the circuit to condition for testing the next group of connectors.

The unused terminals of brush 302 are strapped together and connected to the winding of relay 309 and battery. When switch 300 steps off the last working contact and onto a contact connected to relay 309 the circuit is completed over contact 344 of key 340, lower back contact of relay 506, back contact of relay 508 to ground, operating relay 309 which lights lamp 317 and locks under the control of key 340. The test man will then operate key 340 which in turn operates release magnets 318, 404, and 334. It also operates magnet 307 through the off-normal contacts of brush 301, restoring switch 300 to normal. In addition it closes a circuit for relay 420 to restore switch 320 to normal if that should be off-normal at the time the key is operated. Keys 350 and 503 will also be restored at this time. The circuit is thereby restored completely to normal.

If it is desired to test the ability of the connector to react to the selection of a busy line, keys 430 and 621 are operated. With key 430 operated lamp 432 is lighted to indicate that the connectors are being tested for response to a busy line. This key also transfers conductor 222 from the winding of relay 428 over contact 433, resistance 463, upper winding of relay 464 to ground in simulation of the sleeve condition of a busy line. Key 621 closes a short circuit around resistance 609 and connects a 1500 ohm resistance 622 around the pulsing contact carried by cam 516, to simulate a low resistance calling line having a leak across the line. Testing progresses as previously described until the connector tests the test line terminal. The connection of resistance 463 and relay 464 to the sleeve terminal of the test line permits relay 213 to operate. When relay 210 releases, relay 213 is held operated over the middle lower back contact of relay 211, lower normal contact of relay 210, upper front contact of relay 213 to ground at the inner upper front contact of relay 202. Relay 213 closes a circuit from ground through the secondary winding of busy tone coil 214, lower contact of relay 213, lower winding of relay 217 to ground. This tone is transmitted back through the condenser 225 to the amplifier 800 in the manner described for the ringing induction.

Relay 464 operates in series with relay 213 and locks through its lower winding and lower contact to ground at the lower contact of relay 610. Relay 464 closes an obvious circuit for relay 426, lighting lamp 614 as before. It also connects ground to the winding of relay 803. When the busy tone is received by the amplifier relay 803 operates, closing a circuit from ground at the front contact of relay 803, contact 435 of key 430, winding of relay 802 to battery. The operation of relay 802 therefore is an indication that the busy test was applied and the busy tone returned by the connector. Relay 802 locks over its uppermost contact, back contact of relay 529, conductor 120, inner upper front contact of relay 106, sleeve brush of test selector 100 to ground on conductor 203. Relay 802 connects ground over its inner upper front contact to conductor 710 and thence over contact 362 of key 360, back contact of relay 374, contact 363 of key 360 to the winding of magnet 333 and battery, advancing switch 330 to its next position. Ground over conductor 710 also extends over the back contact of relay 518, uppermost back contact of relay 506, uppermost back contact of relay 525 to the winding of relay 526 and battery. Relay 526 connects ground over its contact, inner upper back contact of relay 525, contact 346 of key 340, brush 301, conductor 121, lowermost front contact of relay 106, winding of rotary magnet 107 to battery, advancing the test selector to the next connector. The advance of the test selector disconnects conductor 120 from conductor 203, releasing relay 802 and restoring the connector to normal, which in turn releases relay 464. Ground over conductor 710 is also connected to the winding of relay 528 over the back contact of relay 524 to prepare for testing the condition of the connector. The connectors may be thus tested in rotation for response to the busy condition. The advance from level to level and from test selector to test selector takes place as in the test first described.

If the connector in response to the interrupter machine 500 should fail to reach its 99th terminal, that is the test line, no test relay will be operated at the test line end of the test circuit. That is, relay 428 will fail to operate if key 430 is normal and relay 464 will fail to operate if key 430 is operated. In either case no circuit will be closed for relay 426 and the locking circuit of relay 612 will remain closed. The circuit of relay 605 is also maintained closed preventing the reoperation of relay 604. When relay 601 operates after a predetermined interval as previously described, a circuit is closed from battery through the winding of relay 623, inner lower front contact of relay 612, uppermost front contact of relay 601, lowermost back contact of relay 426 to ground. Relay 623 closes a substitute circuit for relay 604 which now operates in series with relay 511 to prevent the further transmission of pulses from the interrupter machine. Relay 601 also lights lamp 624. The operation of relay 604 connects retard coil 607 in series with relay 608 in the loop circuit. Relays 604 and 612 also connect the loop circuit to the tip and ring of jack 625 including condenser 626. Lamp 613 and jack 625 appear at an A operator's position. If the subscriber, whose line has been selected in error, answers, the current flow through the loop circuit is reversed and relay 608 which was connected across the loop circuit when relay 604 was operated, closes a circuit from battery through lamp 613, lowermost front contact of relay 612, front contact of relay 608 to ground at the inner upper back contact of relay 429. The A operator in responding to the lamp operates relay 630 over the sleeve of jack 625. Relay 630 closes a holding circuit for relays 601 and 604. The operator can then inform the subscriber that his bell was rung in error. If the called subscriber does not answer, relay 608 remains unoperated and the operator is not signaled. However the operation of relay 601 sounds the alarm and summons the attendant. The lighting of lamp 624 informs him that the connector failed to select the test line terminal. The test man can then connect his telephone with jack 627 as a further check against restoring the connector while the subscriber is connected with the test circuit. If the subscriber has not answered or has restored his receiver the test man then operates keys 425 and 465. Key 465 closes an obvious circuit for relay 427 which disconnects conductor 220 from the test equipment, connects ground to conductor 710 and disconnects ground from the locking circuit of relay 612. It also operates release magnet 404 of switch 400. Key 425 operates relay 802 which also grounds conductor 710. The grounding of conductor 710 advances switch 330 and the test selector as above described.

If it is merely desired to determine that the connector responds properly to the positioning impulses, key 810 is operated, lighting lamp 832. With key 810 operated the operation of relay 428 in response to the selection of the test terminals closes a circuit from battery through the winding of relay 628, contact 813 of key 810, front contact of relay 428, back contact of relay 608 to ground at the inner upper back contact of relay 429. Relay 628 operates, locks over its lower front contact independent of relay 608, and operates relay 426. With relay 628 operated the tip conductor 220 is connected over the back contact of relay 427, upper front contact of relay 628 through resistance 461 to the ring conductor 221 to operate relay 216 and stop the application of ringing current. When relay 608 operates in response to the reversal of current flow in the loop circuit, relay 802 is operated over contact 814 of key 810, normal contact of relay 612, front contact of relay 608 to ground at the inner upper back contact of relay 429. Relay 802 grounds conductor 710, advancing the switch 330 and the test selector. Under these conditions switch 400 is not advanced from the normal position.

When it is desired to make repeated tests on a particular connector, key 360 is operated. This key disconnects conductor 710 from relay 526 and magnet 333 thus preventing the advance of either the test selector or switch 330 at the completion of the test of the connector. It also opens the circuit for releasing relay 370 and for advancing or releasing switch 310.

If a particular connector has been adjusted and it is desired to select that connector for testing, the dial key 711 is operated. At its left contact key 711 operates relay 712 over the pulsing contact of dial 713 and also supplies locking ground for the pairs of counting relays 714 to 721. At its right contact key 711 prepares a circuit for grounding conductor 710. In addition key 350 is operated but key 503 is not operated. Since in such a case it would be desirable to make repeated tests on the connector the repeat key will also be operated. The operation of key 350 prepares the circuit for operation but with key 360 operated the automatic advance of the test switches is prevented. Each connector has a definite position with respect to switch 300 and the test selector in which it appears, and a chart would be provided, indicating the number to be dialed to reach any particular connector. This would consist of four digits, two for positioning switch 300, one for positioning the test selector vertically and one for positioning the test selector horizontally. At the first operation of the dial, the off-normal contact closes a circuit over the back contact of relay 715 for relay 714 which then locks through the winding of relay 715 to ground at the dial key 711 but relay 715 is shunted at the off-normal contact of the dial in the usual manner for counting relays. As the dial returns, the circuit of relay 712 is intermittently opened to close a circuit from battery through the winding of magnet 307 of switch 300, lower back contact of relay 717, lower front contact of relay 714, back contact of relay 712 to ground at the off-normal contacts of dial 713. Switch 300 is thereby advanced into a position corresponding with the digit dialled. When the dial reaches normal relay 715 operates and prepares a circuit for relay 716. Since switch 300 has twenty sets of terminals and therefore may have access to twenty test selectors, two sets of digits are employed in setting this switch. Therefore the second digit is also directed to the winding of magnet 307. The closure of the off-normal contact of the dial 713 during the second digit causes the operation of relay 716 and in turn relay 717. With relay 717 operated the pulsing circuit above traced extends over the lower front contact of relay 717, outer lower back contact of relay 719, back contact of relay 314 to the winding of magnet 313 of switch 310. Magnet 313 steps switch 310 to a position corresponding to the digit dialled. When the dial is moved off-normal for the third digit relay 718 is operated and locks in series with relay 719. When the dial returns to normal relay 719 operates in this circuit and closes a circuit for relay 504. The operation of relay 504 prepares a circuit for testing whether the test selector is busy or idle. Assuming that the test selector is idle the loop circuit will be closed to relay 101 which in turn operates relay 102 connecting ground to conductor 116. This ground causes the operation of relay 517 which in turn operates relay 314 to initiate the transmission of pulses to the test selector. When the test selector has been raised to the desired level the dial will be operated again, this time operating the counting relay 720 which locks through the winding of relay 721. The pulsing circuit at this time extends over the outer lower front contact of relay 719, outer lower contact of relay 721, outer lower front contact of relay 718 to magnet 333 to step switch 330 to a position corresponding to the digit dialled. A circuit extends in parallel therewith over the back contact of relay 374, contact of relay 518, uppermost back contact of relay 506, outer upper back contact of relay 525 to the winding of relay 526 so that relay 526 pulses in synchronism with the dial. Relay 526 in turn connects ground over its contact, inner upper back contact of relay 525, contact 346 of key 340, brush 301, conductor 121, outer lower front contact of relay 106, to the winding of rotary magnet 107 and battery, thus rotating the test selector to the desired connector. When relay 718 operated and the test selector was found idle a circuit was closed from battery through the winding of relay 528, upper back contact of relay 721, right contact of key 711, upper front contact of relay 718 to ground at the inner upper front contact of relay 523. When relay 721 operates at the completion of the last digit this circuit is opened and relay 528 releases after an interval to initiate the testing and positioning of the connector. The dial key 711 may now be restored to normal and the testing of the selector will continue as described hereinbefore.

If it is desired to make a routine test of only a part of the connectors in the office the test may be started at any particular connector by the operation of the dial key 711 and the dialing of the proper code. The test circuit will function in the manner just described except that key 360 is not operated and the test will progress from connector to connector in the manner of the original routine test.

What is claimed is:

1. In a switching system, a selector, an impulse switch for variably positioning said selector, a control switch for designating the number of impulses to be transmitted by said impulsing switch, means to cause said selector to be restored to normal and means operated by the restoration of said selector to alter the position of said control switch.

2. In a testing system, a testing device, apparatus to be tested, a selector for associating said device with said apparatus to be tested, an impulsing switch for variably positioning said selector, a control switch for controlling the number of impulses to be transmitted by the impulse switch, means for releasing said selector and means operated by the release of said selector for repositioning said control switch and for actuating said impulse switch.

3. In a telephone system, a testing device, apparatus to be tested, a two motion selector switch for associating said device with said apparatus to be tested, an impulsing switch controlling one motion of said selector, a control switch for variably controlling the number of impulses to be transmitted by said impulse switch, means for advancing said selector in its second motion in response to the successful completion of a test, means for releasing said selector after the successful completion of a predetermined number of tests and means operated by the release of said selector for repositioning said control switch and for actuating said impulse switch.

4. In a testing system, a connector to be tested, a testing device, means under the control of said testing device for selecting said connector, a set of terminals associated with said testing device, means to operate said connector to select said set of terminals, means in said connector to apply ringing current to said terminals, means to transmit an induced ringing tone to said testing device through said selecting means, and means in said testing device responsive to the simultaneous application of ringing current and ringing tone to initiate additional tests.

5. In a testing system, a connector to be tested, a testing device, means under the control of said testing device for selecting said connector, a set of terminals associated with said testing device, means to operate said connector to select said set of terminals, means in said connector to apply ringing current to said terminals and to transmit an induced ringing tone to said selecting means, a relay in said testing device and means operated by said ringing current and by said ringing tone to jointly complete the circuit of said relay.

6. In a testing system, a connector to be tested, a testing device, means under the control of said testing device for selecting said connector, a set of terminals associated with said testing device, means to operate said connector to select said set of terminals, means in said connector to apply ringing current to said terminals, means to transmit an induced ringing tone to said testing device through said selecting means, means to amplify said ringing tone and means in said testing device responsive to the simultaneous action of said ringing current and said amplified ringing tone to initiate additional tests.

7. In a testing system, a connector to be tested, a testing device, means under the control of said testing device for selecting said connector, a set of terminals associated with said testing device, means to operate said connector to select said set of terminals, means in said connector to apply ringing current to said terminals, means to transmit an induced ringing tone to said testing device through said selecting means, means to amplify said ringing tone, a relay connected with said amplifying means, means responsive to the simultaneous reception of said ringing tone and said ringing current to complete the circuit of said relay, means for generating a tone of different frequency, means to transmit said tone over said terminals to said amplifying means, and means to automatically alter the circuits of said amplifying means to render it responsive to said different frequency.

8. In a testing system, a connector switch to be tested, a testing device, means under the control of said testing device for selecting said connector, a set of terminals associated with said testing device, means to operate said connector to select said set of terminals, means in said connector to apply ringing current to said terminals, means to transmit an induced ringing tone to said testing device through said selecting means, means to amplify said ringing tone, a relay connected with said amplifying means, means responsive to the simultaneous reception of said ringing tone and said ringing current to complete the circuit of said relay, means under the control of said relay for causing the connector to disconnect said ringing current and said ringing tone, means for generating a tone of different frequency, and means responsive to said disconnection of ringing current to cause the transmission of said tone over said terminals through said connector to said amplifying means, said means being effective to automatically alter the circuits of said amplifying means to render it responsive to said different frequency.

9. In a testing system, a connector to be tested, a testing device, means under the control of said testing device for selecting said connector, a set of terminals associated with said testing device, means in said device normally effective to operate said connector to select said terminals and means effective if said connector fails to select said terminals to connect said connector through said testing device with an operator's position.

10. In a testing system, a connector to be tested having an incoming set of terminals, subscriber's line terminals to which said connector has access, a testing device, means under the control of said testing device for selecting said connector over said incoming terminals, a set of terminals associated with said testing device, means in said device normally effective to operate said connector to select said terminals, an operator's position, a signal thereat, means effective if said connector selects the terminals of a subscriber's line to connect said incoming set of terminals with said operator's position and means to operate said signal if the subscriber, whose line has been selected, answers.

In witness whereof, I hereunto subscribe my name this 4th day of August, 1930.

JOHN B. DRAPER.